United States Patent [19]
Patel

[11] 3,833,817
[45] Sept. 3, 1974

[54] EMERGENCY LIGHTING SYSTEM

[75] Inventor: Raoji Patel, Watertown, Mass.

[73] Assignee: North American Philips Corporation, New York, N.Y.

[22] Filed: Apr. 16, 1973

[21] Appl. No.: 351,243

[52] U.S. Cl.................................. 307/66, 315/86
[51] Int. Cl. ............................................. H02j 9/06
[58] Field of Search ............. 307/66, 64, 85, 86, 87, 307/56, 43; 315/86, DIG. 7, 171

[56] References Cited
UNITED STATES PATENTS
3,684,891  8/1972  Sieron................................. 307/66

*Primary Examiner*—Herman Hohauser
*Attorney, Agent, or Firm*—Frank R. Trifari; Bernard Franzblau

[57] ABSTRACT

An emergency lighting system that includes an electric discharge lamp and a DC-AC converter to supply emergency power to the lamp upon failure of the AC line voltage. A battery is charged with a constant current from the AC supply voltage. A transistor switching device connects the battery to the converter when a sensing device senses the absence of the AC voltage. A bias voltage that holds the switching device closed is derived from the battery via the emitter-collector path of the transistor switch. A given drop in the battery voltage is sensed to open the switching device to prevent an excessive current drain on the battery. The presence of the AC voltage is sensed to hold the switching device open and thereby prevent operation of the converter during normal operation of the lighting system.

12 Claims, 1 Drawing Figure

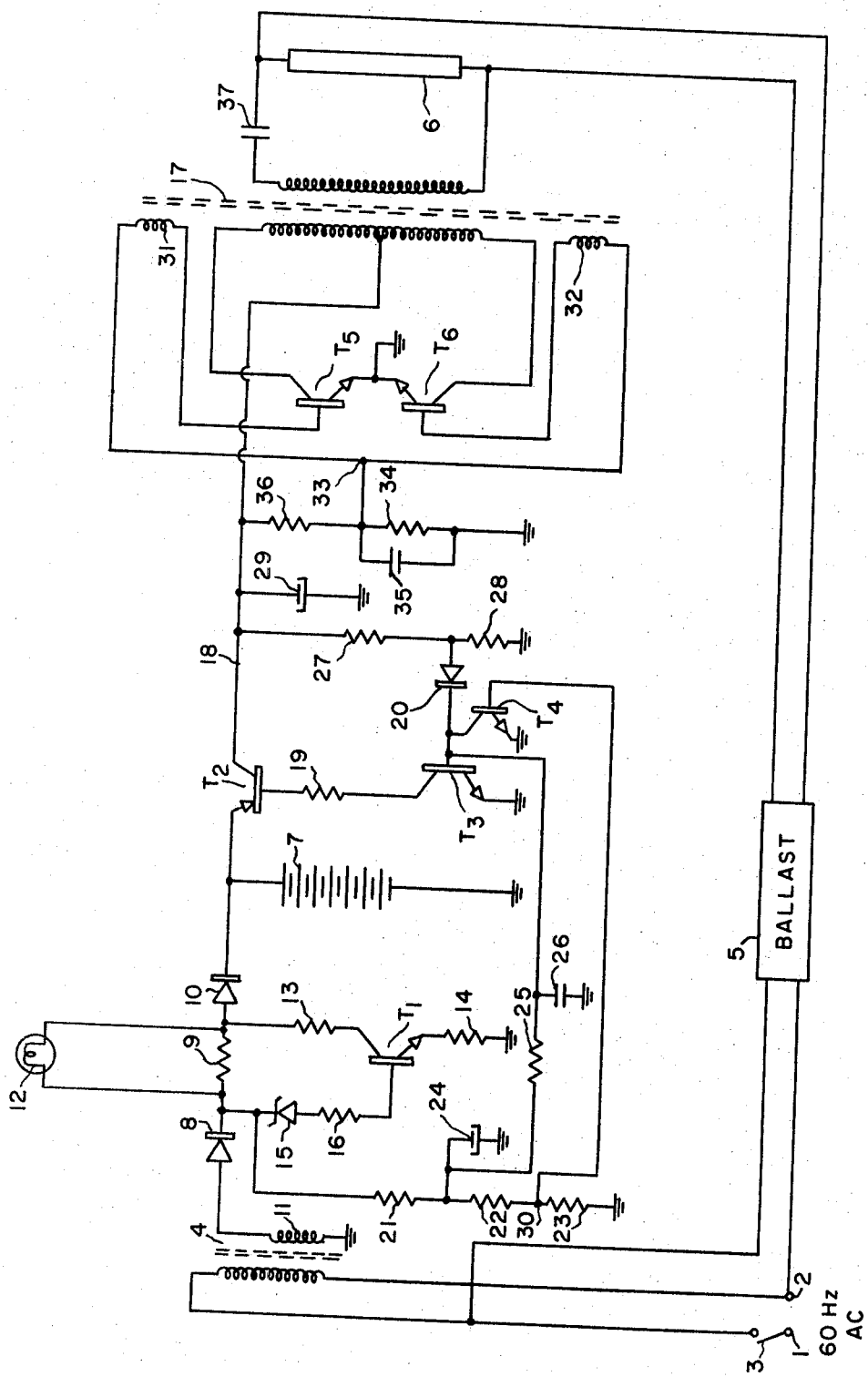

EMERGENCY LIGHTING SYSTEM

BACKGROUND OF THE INVENTION

This invention relates to an improved form of electric lighting system more particularly to a high efficiency emergency lighting system that utilizes electric discharge lamps and rechargeable batteries.

Electric power failures due to inclement weather conditions and equipment breakdowns have been a plague for many years. In winter, ice and snow on exposed high voltage lines may cause a line to rupture and produce a blackout in the community serviced thereby. Hurricanes and other wind storms also cause power failures. More recently, widespread areas have suffered blackouts due to over-loading of the generating or transmission equipment. A power failure, no matter what the cause, may very well jeopardize human life and thus there are many installations which require some form of emergency lighting system that will automatically come into operation upon the occurrence of a power failure. The high efficiency of a fluorescent lamp makes it especially valuable for use in an emergency lighting system.

Many of the emergency lighting systems available on the market utilize a rechargeable battery as the source of power for the system. Since there is a finite limit on the length of time that a battery can power an illumination system, it is important that the system have a high efficiency. A partial solution to this problem is to use a high efficiency DC-AC converter. One of the problems of available emergency lighting systems using a converter is that the converter cannot be operated without a load. If a rechargeable nickel cadmium battery is used, care must be taken to limit the charge current to a value that will not exceed the maximum overcharge current of the battery.

It is also a common practice to provide a completely separate self contained emergency lighting system including separate emergency lamps, a battery together with a circuit for charging same, and means for sensing an AC power failure along with means for automatically connecting the battery to the emergency lamps when a power failure occurs. This is an expensive and generally inefficient solution of the problem in that it requires two separate illumination systems, only one of which is in use at any given time. One solution to this problem is described in U.S. Pat. No. 3,660,714 wherein a single lamp or group of lamps is used for both the normal AC operation of the lighting system and for emergency operation using a battery as the power source.

The present invention provides a new and improved circuit configuration for an emergency lighting system which overcomes many of the illuminations and disadvantages of the aforesaid known emergency lighting systems.

It is therefore an object of the present invention to provide a new ad improved emergency lighting system of simplified and economical construction.

Another object of the invention is to provide novel circuitry which will limit variations in the battery charge current due to AC line voltage variations so that a charge current can be supplied which closely approaches the maximum limit of the battery overcharge current.

A further object of the invention is to provide a high efficiency emergency lighting system that can deliver electric energy to the lighting system for a longer period than similar systems generally available at this time.

Yet another object of the invention is to provide an emergency lighting system wherein the battery does not supply power to the converter when the AC line voltage is present, but automatically supplies such power upon a failure of the AC voltage.

A further object of the invention is to provide a new and improved emergency lighting system having means for preventing a reversal in the battery polarity by automatically disconnecting the battery when the voltage drops below a certain level.

Another object of the invention is to provide a novel emergency lighting system in which the converter output can be left unloaded without causing any damage to the circuit.

A still further object of the invention is to provide a new and improved circuit which allows the battery to be replaced without danger to service personnel.

SUMMARY OF THE INVENTION

In a preferred embodiment of the invention a transistor switch is connected between the battery and a DC-AC converter which in turn energizes a fluorescent lamp load under emergency conditions. A transistor control circuit senses the condition of the AC line voltage which, if present, causes the transistor switch to disconnect the battery from the converter. The transistor control circuit also functions, under emergency conditions, to connect the battery to the converter via the transistor switch when it senses a failure of the AC line voltage. The transistor control circuit serves a dual function in that it also senses the level of the battery voltage under emergency conditions and operates the transistor switch to disconnect the battery from the converter when the battery voltage drops below a predetermined safe level. A further feature of the invention is the provision of circuitry to regulate the battery charge current so that variations in the AC line voltage do not effect the charge current, whereby a charge current closely approaching the maximum battery overcharge current can be supplied without danger to the battery.

BRIEF DESCRIPTION OF THE DRAWING

The invention will now be described in greater detail with reference to the accompanying drawing, the sole FIGURE of which illustrates a schematic diagram of a preferred embodiment of the emergency lighting system.

DESCRIPTION OF THE PREFERRED EMBODIMENT

Referring to the FIGURE, input terminals 1, 2 are adapted to be connected to the 60 Hz AC supply lines normally available from a local electric utility or the like. A test switch 3 is connected between input terminal 1 and a terminal of the primary winding of a supply transformer 4. The other terminal of the transformer primary winding is directly connected to input terminal 2. A conventional ballast device 5 is connected between the transformer primary winding and a gas or vapor discharge lamp 6. As long as the AC power is available at input terminals 1, 2, the discharge lamp will be energized via the ballast 5 and test switch 3 in the conventional manner. A battery charger circuit for nickel cadmium battery 7 includes the secondary winding 11 of transformer 4, diode 8, current limiting resistor 9 and diode 10 connected in series across the battery 7. The bottom terminal of battery 7 and secondary winding 11 are each connected to a common ground terminal for the system. Diode 10 serves to isolate the automatic control circuit, to be discussed below. The battery is charged with a half wave charging current by means of the diode 8. A lamp 12 is connected across resistor 9 to provide a visual indication of the operation of the charge circuit.

A resistor 13 is connected between the collector of NPN transistor $T_1$ and the junction point between resistor 9 and diode 10. The emitter of transistor $T_1$ is connected to ground via an emitter resistor 14. A zener diode 15 and a resistor 16 are serially connected between the junction of diode 8 and resistor 9 and the base of transistor $T_1$. Variations in the battery charge current due to variations in the AC line input voltage are substantially eliminated by the regulating action provided by transistor $T_1$ in cooperation with resistors 13, 14 and 16 and zener diode 15. Zener diode 15 provides level shifting and allows the base of transistor $T_1$ to follow variations in the voltage at the cathode of diode 8. An increase in the AC line voltage causes a proportional increase in conduction through transistor $T_1$ which tends to maintain the battery charge current constant irrespective of the aforesaid variations in the AC input voltage. Similarly, a decrease in the AC line voltage causes a proportional decrease in the conduction of transistor $T_1$ with a corresponding current regulating operation for the battery. As a result of the action of $T_1$ and its associated regulating elements, a charge current closely approaching the maximum battery overcharge current can be used in the system thereby improving the system efficiency and without danger to the battery.

In addition to the battery charging circuit already described, the emergency lighting system also includes an automatic control circuit and a DC-AC converter. The automatic control circuit controls the current drain from the battery. It includes means for sensing the AC line input voltage along with means for preventing the flow of battery current to the converter in the presence of the AC line voltage and means for supplying battery current to the converter in the absence of the AC line voltage. It also prevents a reversal of the battery polarity by automatically terminating the current drain from the battery when the battery voltage drops below a given potential level.

The automatic control circuit includes a PNP transistor $T_2$ having its emitter connected directly to the positive terminal of battery 7 and its collector connected to a center tap on the primary winding of the converter transformer 17 via a lead 18. The base of transistor $T_2$ is connected to the collector of NPN transistor $T_3$ by means of a resistor 19. The emitter of transistor $T_3$ is connected directly to ground. Transistor $T_2$ controls the supply of battery power to the converter and is in turn controlled by the conductive state of transistor $T_3$. The base of transistor $T_3$ is connected to the collector of NPN transistor $T_4$ and to the cathode of diode 20. The emitter of $T_4$ is connected to ground. Transistor $T_4$ controls transistor $T_3$.

A voltage divider consisting of serially connected resistors 21, 22 and 23 is provided between the cathode of diode 8 and ground. A capacitor 24 is connected between the junction of resistors 21 and 22 and ground. In order to sense the presence of an AC input voltage, the half wave rectified voltage at the cathode of diode 8 is converted into a DC voltage by means of the resistor 21 and capacitor 24. The DC voltage across capacitor 24 is applied to the base of transistor $T_3$ via a resistor 25. A portion of the capacitor DC voltage is tapped off at the junction 30 of resistors 22 and 23 and is directly coupled to the base of transistor $T_4$. A filter capacitor 26 is connected between the base of $T_3$ and ground.

A second voltage divider consisting of the series combination of resistors 27 and 28 is connected between the collector of transistor $T_2$ and ground. A second filter capacitor 29 is connected between the line 18 and ground. The junction of resistors 27 and 28 is connected to the anode of diode 20.

In the presence of an AC input line voltage, the DC voltage at the tap point 30 will drive transistor $T_4$ into saturation. Saturation of $T_4$ will cut-off transistor $T_3$ and in turn transistor $T_2$. As a result, there will be no battery power supplied to the converter via line 18. This is the normal mode of operation of the system and power to the lamp 6 is then derived from the AC input terminals via ballast 5.

In the case of a failure of the AC line input voltage, capacitor 24 begins to discharge via resistors 22 and 23 and the transistor $T_4$. At a given voltage level across capacitor 24, transistor $T_4$ will start to cut-off while transistor $T_3$ will begin to conduct. Conduction in transistor $T_3$ allows transistor $T_2$ to conduct. The battery voltage is then applied to resistors 27 and 28 and to capacitor 29 via line 18 and transistor $T_2$. The DC voltage developed across resistor 28 by the battery 7 provides base drive to transistor $T_3$ via diode 20 so that transistor $T_3$ is driven into saturation and is held in saturation even after capacitor 24 completely discharges. Transistor $T_2$ is also driven into saturation and provides the battery supply voltage for the converter via line 18.

If, after a period of time, the AC input voltage has not yet returned, the battery voltage will drop to a given level such that the voltage drop across resistor 28 is no longer sufficient to maintain transistor $T_3$ in saturation. Transistor $T_3$ will start to cut-off and so will transistor $T_2$, thereby further reducing the base drive for transistor $T_3$. The circuit rapidly latches up with transistors $T_3$ and $T_2$ completely cut-off which thereby prevents any further discharge of the battery.

The DC-AC converter is an inductively coupled free-running multivibrator designed to provide a square wave output which reduces power losses in the converter output transistors and thus improves the converter efficiency. It is of course obvious that other forms of oscillator circuits could be used in place of the free-running multivibrator. The converter includes NPN transistors $T_5$ and $T_6$ with their emitter electrodes connected together to ground. The collector electrodes of $T_5$ and $T_6$ are directly connected to opposite end terminals of the primary winding of output transformer 17. Feedback windings 31 and 32 of transformer 17 each have one end terminal connected together to junction point 33. The other end of winding 31 is connected to the base of transistor $T_5$ and the other end of winding 32 is connected to the base of transistor $T_6$.

The junction point 33 is connected to ground through the parallel connection of resistor 34 and capacitor 35 and to the DC supply line 18 via a resistor 36. Transistors $T_5$ and $T_6$ operate in the switching mode and the energy required to operate them as switches is supplied by the feedback windings 31 and 32. The core of the output transformer 17 is driven into positive and negative saturation on alternate half cycles and induces in the transformer windings an alternating square wave voltage. The secondary winding of output transformer 17 delivers a square wave voltage to the lamp load 6 via a series connected current limiting capacitor 37. The converter operates to supply emergency lighting power to lamp 6 whenever a DC voltage is supplied to line 18 from battery 7 via transistor $T_2$, as previously described.

As will be appreciated from the foregoing detailed circuit description, the present invention will achieve the various objects set forth in the preamble. In addition, since the battery provides the bias voltage for $T_3$ via the emitter-collector path of $T_2$, once the battery supply to line 18 is opened, the converter cannot start again unless the AC input voltage is once again applied to the system. This provides, inter alia, a safety feature when servicing the system. For example, if the AC power is turned off via switch 3 and the battery is replaced, the converter cannot come on again until the AC power is once again applied to the system and then turned off. This can be seen from the fact that capacitor 24 must be charged up before the described sequence of operations can begin. The automatic control circuit prevents excessive discharge of the battery by cutting off transistor $T_2$ and prevents any further operation until the AC input voltage appears again. Other embodiments of the invention and various modifications of the disclosed embodiment may occur to those skilled in the art without departing from the spirit and scope of the invention. Accordingly, it is to be understood that the invention is only limited in scope as defined in the appended claims.

I claim:

1. An emergency system for operating an electric load comprising, a pair of AC line voltage input terminals coupled to said load, a source of DC voltage, an oscillator with its output coupled to said load, a controlled switching device for selectively coupling said DC voltage source to the oscillator to provide the operating voltage for the oscillator, circuit means for sensing the AC voltage across said input terminals and including means coupled to the control electrode of said switching device to hold the switching device open when the AC voltage is present and to close the switching device in the absence of said AC voltage, and means including the DC voltage source and the switching device for supplying a bias voltage to said circuit sensing means of a magnitude and polarity to hold the switching device closed upon actuation thereof by the circuit sensing means and during the time the AC voltage is absent from the input terminals.

2. An emergency system as claimed in claim 1 wherein said circuit sensing means includes a second controlled switching device with a control electrode coupled to said DC voltage source via said first switching device so that a bias voltage is applied thereto when the first switching device is closed, means for coupling an output electrode of the second switching device to the control electrode of the first switching device, and means for effectively coupling the AC voltage at the input terminals to the control electrode of the second switching device.

3. An emergency system as claimed in claim 2 wherein said circuit sensing means further comprises, means for rectifying the AC voltage present at the input terminals, a capacitor with a charge circuit coupled to the rectifying means, and means for applying the capacitor voltage to the control electrode of the second switching device.

4. An emergency system as claimed in claim 3 wherein said DC voltage source comprises a battery coupled to said rectifying means to receive a charge current therefrom, said system further comprising means for sensing the rectified input voltage and responsive thereto for varying the charge current so as to maintain said current constant despite variations in the AC voltage.

5. An emergency system as claimed in claim 2 wherein said bias voltage supplying means comprises a voltage divider connected to the DC voltage source via the first switching device and having a tap point coupled to the control electrode of the second switching device and located on the divider so that at a predetermined lower level of the potential of the DC voltage source the second switching device will change state and thereby control the first switching device into its open condition thereby to inhibit the supply of bias voltage and the oscillator operating voltage.

6. An emergency system as claimed in claim 5 wherein said DC voltage source comprises a battery and the load comprises an electric discharge lamp.

7. An emergency lighting system comprising, an electric discharge lamp, a ballast device, a pair of AC voltage input terminals coupled to said lamp via the ballast device, a battery, a rectifier connected between the input terminals and the battery to supply a DC charge current to the battery, a capacitor coupled to said rectifier to be charged thereby, an oscillator with its output coupled to said lamp, a first transistor with its emitter-collector path connected between the battery and a DC voltage supply line for the oscillator, a second transistor with an output electrode coupled to the base of the first transistor to control the current flow therein, a third transistor with its emitter-collector path in parallel with the base-emitter circuit of the second transistor, means for coupling the capacitor voltage to the base electrodes of the second and third transistors so as to drive the third transistor into saturation when the AC voltage is present to charge the capacitor, said second and first transistors then being held in cut-off by said third transistor whereby operation of the oscillator is inhibited for lack of a DC line supply voltage, a bias circuit for the base of the second transistor that is coupled to the battery via the emitter-collector path of the first transistor, and a discharge circuit for said capacitor adapted to discharge same upon a failure of the AC input voltage whereby, upon a given discharge of the capacitor, the third transistor reverts to the cut-off state to allow said second and first transistors to turn on and supply via the first transistor the DC operating voltage for the oscillator and a bias voltage for the base of the second transistor, said bias voltage being of a magnitude and polarity to hold said second and first transistors in conduction.

8. An emergency system as claimed in claim 1 wherein said circuit sensing means includes means responsive to the AC input voltage for holding the switching device open and for preventing said switching device from closing unless AC voltage is present at the input terminals and then subsequently is absent therefrom whereby operation of the oscillator is conditioned upon the appearance subsequent of the AC voltage at the input terminals.

9. An emergency system as claimed in claim 1 wherein said means coupled to the switching device control electrode comprises a device jointly controlled by the DC voltage source via said switching device and by the AC voltage at the input terminals for controlling the operation of the switching device so as to inhibit the start of oscillations of the oscillator unless the AC and DC voltages are both present.

10. An emergency system as claimed in claim 1 wherein said bias voltage supplying means includes an impedance element responsive to the DC voltage source in the closed condition of the switching device to apply a bias voltage to said circuit sensing means that is determined by the amplitude of the DC voltage.

11. An emergency system as claimed in claim 1 wherein said circuit sensing means comprises a second controlled switching device having a control electrode coupled to said bias voltage supplying means and an output electrode coupled to the control electrode of the first switching device, said DC voltage source comprises a battery, means coupled to said AC input terminals and said battery for applying a constant charge current to said battery, and means for coupling the AC voltage at the input terminals to the control electrode of the second switching device.

12. An emergency system as claimed in claim 11 further comprising indicator means coupled to said charge current applying means, and wherein said bias voltage supplying means includes an impedance element responsive to the DC voltage source in the closed condition of the switching device so that at a given voltage level of the DC voltage source the second switching device will change state and thereby operate the first switching device into its open condition to block the passage of the bias voltage and the oscillator operating voltage.

* * * * *